(12) United States Patent
Aoki (10) Patent No.: US 11,851,117 B2
(45) Date of Patent: Dec. 26, 2023

(54) STEERING CONTROL DEVICE, STEERING CONTROL METHOD, AND COMPUTER PROGRAM PRODUCT

(71) Applicant: DENSO CORPORATION, Kariya (JP)

(72) Inventor: Takashi Aoki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/811,835

(22) Filed: Jul. 11, 2022

(65) Prior Publication Data

US 2022/0348253 A1 Nov. 3, 2022

Related U.S. Application Data

(63) Continuation of application No. PCT/JP2020/043121, filed on Nov. 19, 2020.

(30) Foreign Application Priority Data

Jan. 13, 2020 (JP) ................................ 2020-003317

(51) Int. Cl.
*B62D 6/00* (2006.01)
*B62D 5/04* (2006.01)

(52) U.S. Cl.
CPC ............. *B62D 5/0484* (2013.01); *B62D 6/00* (2013.01)

(58) Field of Classification Search
CPC ...... B62D 5/0484; B62D 6/00; B62D 15/025; B62D 15/0285; B62D 6/002
See application file for complete search history.

(56) References Cited

U.S. PATENT DOCUMENTS

| 6,070,684 A * | 6/2000 | Shimizu | B62D 15/0285 701/41 |
| 2002/0016657 A1 * | 2/2002 | Iwazaki | B62D 1/28 180/443 |
| 2008/0035411 A1 * | 2/2008 | Yamashita | B62D 5/049 180/443 |
| 2009/0164066 A1 * | 6/2009 | Oezaslan | B62D 15/0285 701/41 |
| 2013/0096816 A1 * | 4/2013 | Takano | B62D 15/0275 701/400 |
| 2015/0321668 A1 * | 11/2015 | Elwart | B60T 8/17557 701/41 |

(Continued)

FOREIGN PATENT DOCUMENTS

JP    2004-42769 A    2/2004

*Primary Examiner* — Jeff A Burke
*Assistant Examiner* — Kyle T Johnson
(74) *Attorney, Agent, or Firm* — MASCHOFF BRENNAN (57) ABSTRACT

A steering control device is configured to control steering via a steering actuator of a vehicle. The steering control device includes a condition determination unit and a steering maintenance unit. The condition determination unit is configured to determine whether a maintenance condition required to keep a steering angle at a stop control angle is satisfied, the steering angle being given by the steering actuator to a tire of the vehicle, the stop control angle being the steering angle which is to be given at a stop position where the vehicle stops traveling. The steering maintenance unit is configured to keep the steering angle at the stop control angle in a pre-stop traveling section in which the vehicle travels until the vehicle arrives at the stop position after the maintenance condition is satisfied.

25 Claims, 9 Drawing Sheets

(56) References Cited

U.S. PATENT DOCUMENTS

| | | | |
|---|---|---|---|
| 2016/0023679 A1* | 1/2016 | Matsuoka | B62D 9/00 |
| | | | 74/471 R |
| 2017/0088176 A1* | 3/2017 | Tamura | B62D 15/025 |
| 2018/0118257 A1* | 5/2018 | Fujino | B62D 15/0285 |
| 2019/0027042 A1* | 1/2019 | Fujishima | G05D 1/0225 |
| 2020/0140011 A1 | 5/2020 | Hirata et al. | |
| 2020/0156703 A1 | 5/2020 | Matsuda et al. | |
| 2020/0283063 A1* | 9/2020 | Kashi | B62D 6/008 |
| 2021/0300411 A1* | 9/2021 | Zhu | B62D 15/025 |
| 2022/0295685 A1* | 9/2022 | Matsuzaki | A01B 69/008 |
| 2022/0348253 A1* | 11/2022 | Aoki | B62D 15/025 |

* cited by examiner

| MAINTENANCE CONDITION | NECESSARY CONDITION | CONDITIONAL EXPRESSION | DETERMINATION |
|---|---|---|---|
| C | C1: $V_c$ | $V_c < V_u$ | SATISFIED |
| | | $V_c \geq V_u$ | NOT SATISFIED |
| | C2: $\delta_c$ | $\delta_c < \delta_u$ | SATISFIED |
| | | $\delta_c \geq \delta_u$ | NOT SATISFIED |
| | C3: $L_c$ | $L_c < L_u$ | SATISFIED |
| | | $L_c \geq L_u$ | NOT SATISFIED |
| | C4: $L_c$ | $L_c > L_l$ | SATISFIED |
| | | $L_c \leq L_l$ | NOT SATISFIED |

STEERING CONTROL DEVICE, STEERING CONTROL METHOD, AND COMPUTER PROGRAM PRODUCT

CROSS REFERENCE TO RELATED APPLICATION

The present application is a continuation application of International Patent Application No. PCT/JP2020/043121 filed on Nov. 19, 2020, which designated the U.S. and claims the benefit of priority from Japanese Patent Application No. 2020-003317 filed on Jan. 13, 2020. The entire disclosures of all of the above applications are incorporated herein by reference.

TECHNICAL FIELD

The present disclosure relates to a steering control technique to control steering by a steering actuator of a vehicle.

BACKGROUND

A steering control technique that decreases the steering angle of the vehicle by a power steering motor after the vehicle stops to bring the steering angle closer to zero degrees at which the vehicle can travel straight is known.

SUMMARY

A first aspect of the present disclosure is a steering control device configured to control steering via a steering actuator of a vehicle, the steering control device including: a condition determination unit configured to determine whether a maintenance condition required to keep a steering angle at a stop control angle is satisfied, the steering angle being given by the steering actuator to a tire of the vehicle, the stop control angle being the steering angle which is to be given at a stop position where the vehicle stops traveling; and a steering maintenance unit configured to keep the steering angle at the stop control angle in a pre-stop traveling section in which the vehicle travels until the vehicle arrives at the stop position after the maintenance condition is satisfied.

A second aspect of the present disclosure is a method for a processor to control steering via a steering actuator of a vehicle, the method including: determining whether a maintenance condition required to keep a steering angle at a stop control angle is satisfied, the steering angle being given by the steering actuator to a tire of the vehicle, the stop control angle being the steering angle which is to be given at a stop position where the vehicle stops traveling; and keeping the steering angle at the stop control angle in a pre-stop traveling section in which the vehicle travels until the vehicle arrives at the stop position after the maintenance condition is satisfied.

A third aspect of the present disclosure is a computer program product for controlling steering via a steering actuator of a vehicle, the computer program product being stored on at least one non-transitory computer readable medium and comprising instructions configured to, when executed by at least one processor, cause the at least one processor to: determine whether a maintenance condition required to keep a steering angle at a stop control angle is satisfied, the steering angle being given by the steering actuator to a tire of the vehicle, the stop control angle being the steering angle which is to be given at a stop position where the vehicle stops traveling; and keep the steering angle at the stop control angle in a pre-stop traveling section in which the vehicle travels until the vehicle arrives at the stop position after the maintenance condition is satisfied.

A fourth aspect of the present disclosure is a steering control device configured to control steering via a steering actuator of a vehicle, the steering control device including: an overshoot setting unit configured to set, as a steering angle given to a tire of the vehicle by the steering actuator, an overshoot angle overshooting from a stop control angle that is the steering angle which is to be given at a stop position where the vehicle stops traveling; and a steering oscillation unit configured to give an oscillation to the steering angle such that the steering angle overshoots to the overshoot angle and then the steering angle returns to the steering control angle when an output value output from the steering actuator in response to keeping the steering angle at the stop position is outside an acceptable range.

A fifth aspect of the present disclosure is a method for a processor to control steering via a steering actuator of a vehicle, the method including: setting, as a steering angle given to a tire of the vehicle by the steering actuator, an overshoot angle overshooting from a stop control angle that is the steering angle which is to be given at a stop position where the vehicle stops traveling; and giving an oscillation to the steering angle such that the steering angle overshoots to the overshoot angle and then the steering angle returns to the steering control angle when an output value output from the steering actuator in response to keeping the steering angle at the stop position is outside an acceptable range.

A sixth aspect of the present disclosure is a computer program product for controlling steering via a steering actuator of a vehicle, the computer program product being stored on at least one non-transitory computer readable medium and comprising instructions configured to, when executed by at least one processor, cause the at least one processor to: set, as a steering angle given to a tire of the vehicle by the steering actuator, an overshoot angle overshooting from a stop control angle that is the steering angle which is to be given at a stop position where the vehicle stops traveling; and give an oscillation to the steering angle such that the steering angle overshoots to the overshoot angle and then the steering angle returns to the steering control angle when an output value output from the steering actuator in response to keeping the steering angle at the stop position is outside an acceptable range.

EMBODIMENTS

The inventors have found that when the steering angle given to the tire of the vehicle which stopped traveling is simply decreased, the tire is twisted along with the decrease. As a result, the twisted tire elastically recovers while the vehicle is stopped, resulting in a shift in steering angle, although the twisting itself is eliminated.

Hereinafter, an embodiment will be described with reference to the drawings.

Figure 1:
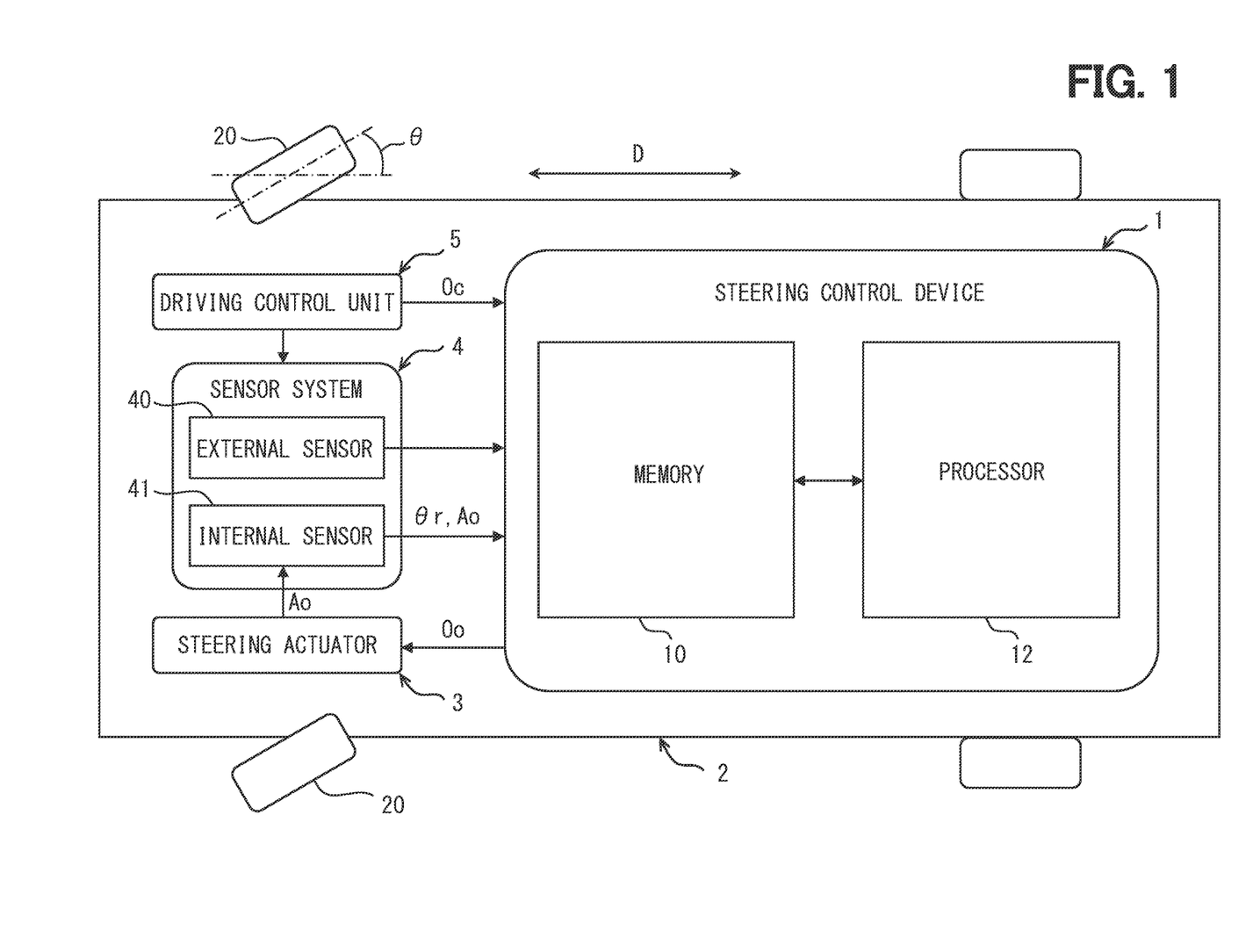
FIG. 1 is a block diagram showing an overall configuration of a steering control device according to an embodiment.

As shown in FIG. 1, a steering control device 1 according to an embodiment is mounted in a vehicle 2. The vehicle 2 is capable of executing a constant or temporary autonomous driving in an automated driving mode. Here, the automated driving mode may be achieved with an autonomous operation control, such as conditional driving automation, advanced driving automation, or full driving automation, where the system in operation performs all driving tasks. The automated driving mode may be achieved with an advanced driver assistance control, such as driver assistance or partial driving automation, where the occupant performs some or all driving tasks. The automated driving mode may be achieved by combining or switching between the autonomous driving control and the advanced driver assistance control.

In the vehicle 2, the steering angle θ of at least a pair of tires 20 (hereinafter, referred to as steering tires) with respect to the front-rear direction D is adjusted according to the automatic steering control by the steering control device 1. The vehicle 2 is equipped with a steering actuator 3, a sensor system 4, and a driving control device 5 together with the steering control device 1.

Figure 2:
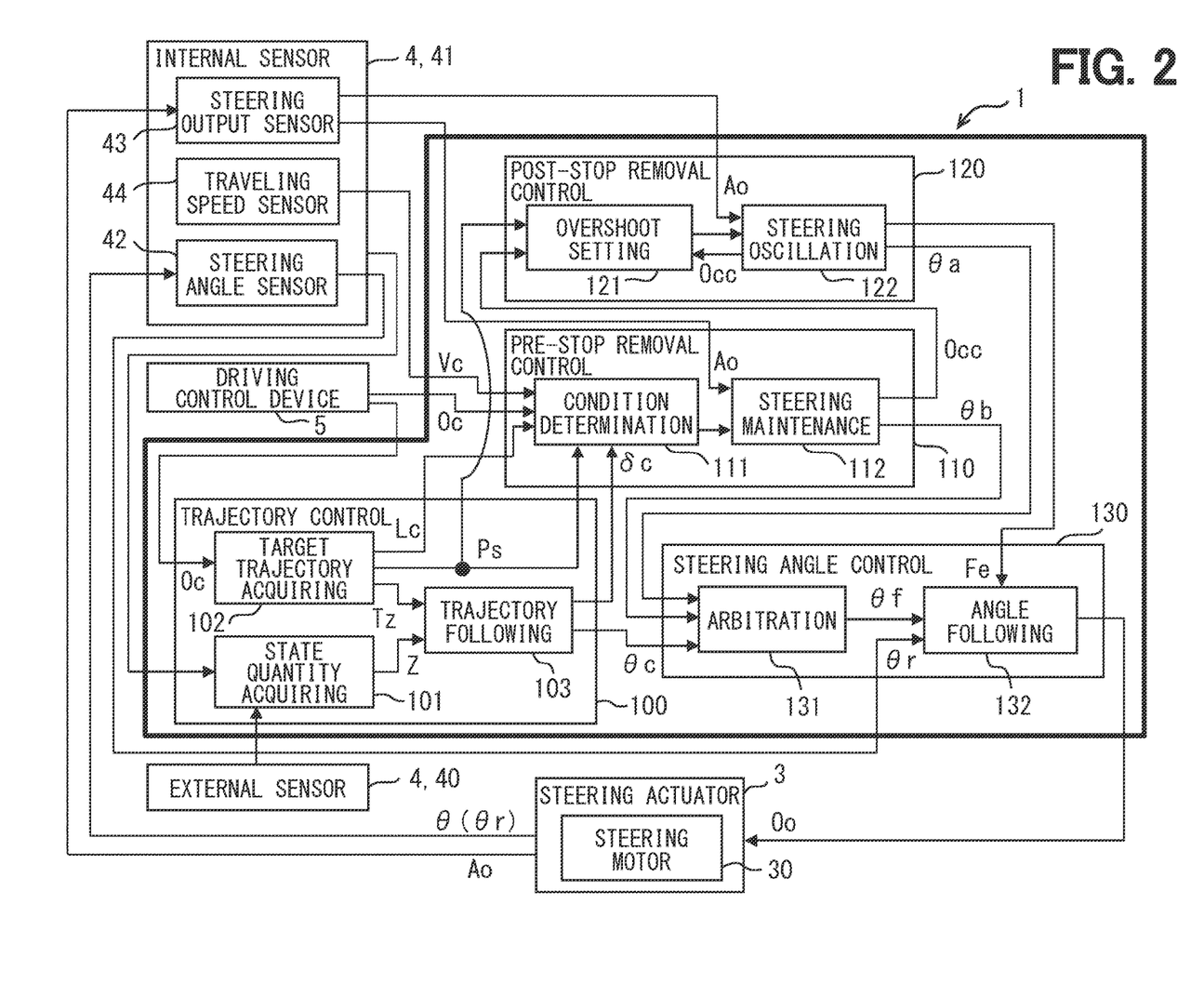
FIG. 2 is a block diagram showing a detail configuration of the steering control device according to the embodiment.

The steering actuator 3 includes an electrical steering motor 30 shown in FIG. 2 and a reducing device (not shown). The steering actuator 3 may constitute a power steering system mechanically cooperating with the steering wheel (not shown) of the vehicle 2. The steering actuator 3 may constitute a steer-by-wire system which is mechanically disconnected but electrically connected with the steering wheel (not shown) of the vehicle 2.

The steering actuator 3 generates the torque by the steering motor 30 in accordance with a steering output instruction Oo, and outputs the torque after amplifying it by the reducing device. The torque is transmitted from the steering actuator 3 to the steering tire 20, and thus the steering angle θ of the tire 20 shown in FIG. 1 is changed. The steering angle θ in the present embodiment is given a positive (plus) value on the right side and a negative (minus) value on the left side with respect to the front-rear direction D of the vehicle 2. The output value Ao from the steering actuator 3 is given a positive or negative value in this way.

The sensor system 4 includes an external sensor 40 and an internal sensor 41. The external sensor 40 is configured to acquire information about the outside of the vehicle 2, which is the surrounding environment of the vehicle 2. The external sensor 40 may acquire the external information by detecting objects existing in the outside of the vehicle 2. The external sensor 40 of the detection type includes one or some of a camera, a LiDAR (Light Detection and Ranging/Laser Imaging Detection and Ranging), a radar, a sonar, and the like, for example. The external sensor 40 may acquire the external information by receiving a signal from an artificial satellite of a GNSS (Global Navigation Satellite System) present in the outside of the vehicle 2 or a signal from a roadside device of ITS (Intelligent Transport Systems). The external sensor 40 of the reception type is at least one of, for example, a GNSS receiver, a telematics receiver, and the like.

The internal sensor 41 is configured to acquire information about the inside of the vehicle 2, which is the internal environment of the vehicle 2. The internal sensor 41 may acquire the internal information by detecting a specific motion physical quantity in the inside of the vehicle 2. The detection type inside sensor 41 includes at least three sensors 42, 43, 44 shown in FIG. 2 such as a steering angle sensor 42, a steering output sensor 43, a traveling speed sensor 44, and an inertial sensor. The steering angle sensor 42 is configured to acquire, as the steering angle θ of the steering tire 20, the internal information directly or indirectly indicating the actual steering angle θr. The steering output sensor 43 is configured to acquire the internal information directly or indirectly indicating the output value Ao of the steering actuator 3.

The driving control device 5 shown in FIG. 1 is connected with the sensor system 4 through at least one of LAN (Local Area Network), a wire harness, an internal bus, and the like. The driving control device 5 is an ECU (Electronic Control Unit) dedicated to an advanced driving assistance or an autonomous driving control for constant or temporal automated driving control of the vehicle 2 as an upper level control than the control of the steering control device 1. The automated driving mode and the manual driving mode can be switched therebetween, and thus the temporal automated control can be achieved.

In the automated control, the driving control device 5 generates control instructions indicating the type of the steering control requested to the steering control device 1 based on the acquired information acquired by the external sensor 40 and the internal sensor 41 of the sensor system 4. The control instructions include a removal control instruction δc that instructs to remove a twist when it is predicted that the steering tire 20 of the vehicle 2 would be twisted. The removal control instruction δc is output when a distance between the vehicle 2 and a traveling stop point becomes a predetermined instruction start distance, for example.

The steering control device 1 is connected with the steering actuator 3, the sensor system 4, and the driving control device 5 through at least one of LAN (Local Area Network), a wire harness, an internal bus, or the like. The steering control device 1 includes at least one dedicated computer. The dedicated computer of the steering control device 1 may be an ECU dedicated to the steering for controlling the steering actuator 3. The dedicated computer of the steering control device 1 may be an ECU of the locator used for the advanced driver assistance or the automated driving control of the vehicle 2. The dedicated computer of the steering control device 1 may be an ECU of the navigation device configured to navigate the driving of the vehicle 2. The dedicated computer of the steering control device 1 may be the ECU shared with the driving control device 5. The steering control device 1 may be constituted as a combination of the above described dedicated computers that share the following functions.

The dedicated computer of the steering control device 1 has at least one memory 10 and at least one processor 12. The memory 10 is at least one type of non-transitory tangible storage medium, such as a semiconductor memory, a magnetic medium, and an optical medium, for non-transitory storage of computer readable programs and data. The processor 12 includes, as a core, at least one of, for example, a CPU (Central Processing Unit), a GPU (Graphics Processing Unit), an RISC (Reduced Instruction Set Computer) CPU, and so on.

The processor 12 executes multiple instructions included in a steering control program stored in the memory 10. Accordingly, the steering control device 1 includes functional blocks for controlling the steering of the vehicle 2, as shown in FIG. 2. As described above, in the steering control device 1, the functional blocks are built by causing the processor 12 to execute multiple instructions of the steering control program stored in the memory 10 for controlling the steering of the vehicle 2. The functional blocks include a trajectory control block 100, a pre-stop removal control block 110, a post-stop removal control block 120, and a steering angle control block 130.

The trajectory control block 100 is configured to control a trajectory which is to be followed by the vehicle 2. Accordingly, the trajectory control block 100 includes sub-blocks 101, 102, 103 which have different functions.

A state quantity acquiring sub-block 101 is configured to acquire the state quantity Z of the vehicle 2 by the estimation process based on the acquired information of the external sensor 40 and the internal sensor 41 of the sensor system 4. The state quantity Z contains at least the position of the vehicle 2. The state quantity Z may further contain at least one of the traveling speed and the yaw angle.

A target trajectory acquiring sub-block 102 is configured to acquire target trajectory Tz in accordance with the steering instruction from the driving control device 5 as the traveling trajectory defining the state quantity Z of the vehicle 2 containing the position. The target trajectory acquiring sub-block 102 generate the target trajectory Tz that covers a pre-stop traveling section Sb shown in FIGS. 3, 5 in response to an input of the removal control instruction δc from the driving control device 5. The target trajectory acquiring sub-block 102 is configured to acquire, by extracting from the target trajectory Tz, the target stop position Ps that is the planned position for the vehicle 2 to stop traveling. The target trajectory acquiring sub-block 102 is configured to acquire, by calculating a difference, the planned traveling distance from the current position of the vehicle 2 of the state quantity Z to the planned stop position Ps.

A trajectory following sub-block 103 shown in FIG. 2 is configured to execute a trajectory following control to cause the state quantity Z acquired by the state quantity acquiring sub-block 101 to follow the target trajectory Tz acquired by the target trajectory acquiring sub-block 102. By the trajectory following control, the trajectory following sub-block 103 sets a following target angle θc as the steering angle θ for bringing the state quantity Z closer to the defined value of the target trajectory Tz. The trajectory following sub-block 103 acquires a control deviation Oc as a deviation between the state quantity Z and the defined value of the target trajectory Tz. The control deviation δc is at least one of a lateral deviation of the trajectory and an angle deviation of the vehicle 2. The control deviation δc in the present embodiment is given a positive (plus) value on the right side and a negative (minus) value on the left side with respect to the front-rear direction D of the vehicle 2.

The pre-stop removal control block 110 is configured to execute a pre-stop removal control for removing the twist, which is predicted to occur in the steering tire 20, before the vehicle 2 stops traveling. Accordingly, the pre-stop removal control block 110 includes sub-blocks 111, 112 having different functions.

Figure 3:
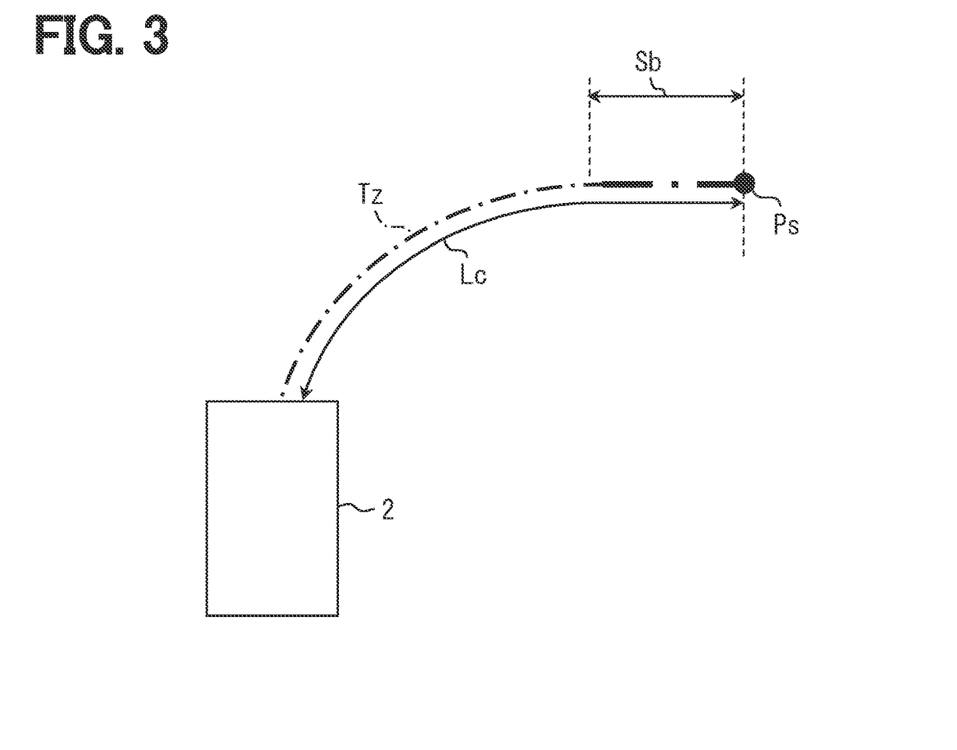
FIG. 3 is a diagram for explaining a traveling of a vehicle according to the steering control of the steering control device according to the embodiment.
Figure 4:
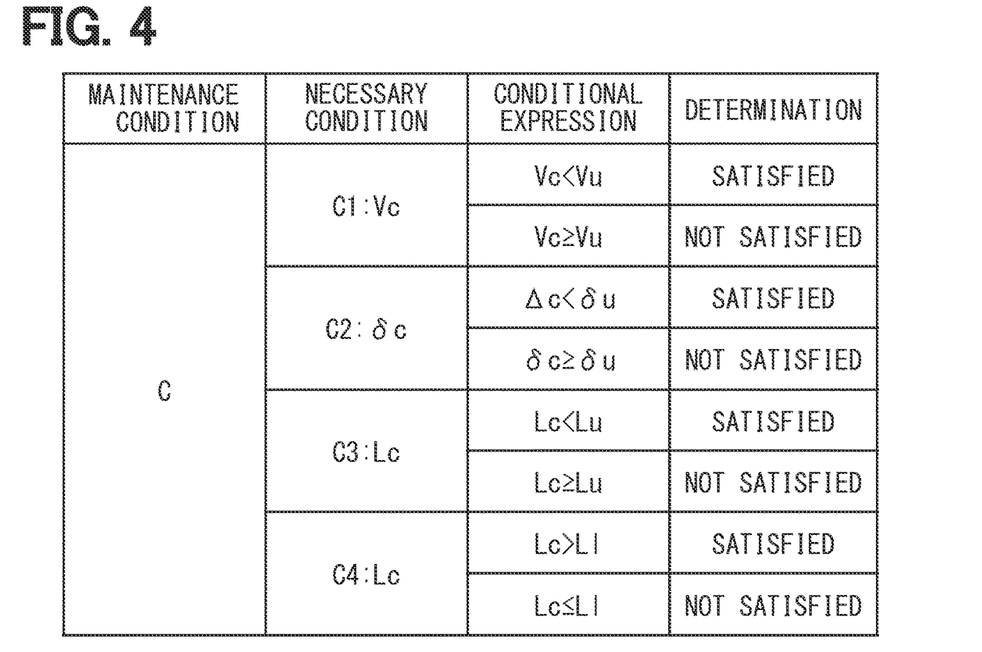
FIG. 4 is a diagram for explaining a pre-stop removal control of the embodiment.

A condition determination sub-block 111 receives an input of the removal control instruction δc from the driving control device 5. The condition determination sub-block 111 receives an input of the stop position Ps from the target trajectory acquiring sub-block 102. In response to these inputs, the condition determination sub-block 111 determines whether a maintenance condition C shown in FIG. 4 is satisfied. The maintenance condition C includes necessary conditions C1-C4 required for maintaining a stop control angle θs (see FIGS. 5, 6) at the stop position Ps where the vehicle is going to stop. In the present embodiment, a pre-stop traveling section Sb is defined as a section in which the vehicle 2 travels until the vehicle 2 reaches the stop position Ps after the necessary conditions C1-C4 are satisfied as shown in FIG. 3.

A first condition C1 shown in FIG. 4 is a condition related to a traveling speed Vc of the vehicle 2 required at the start of the pre-stop traveling section Sb. As shown in FIG. 2, the traveling speed Vc is input to the condition determination sub-block 111 as the internal information acquired by the traveling speed sensor 44 of the sensor system 4. When the current traveling speed Vc is less than an upper limit value Vu shown in FIG. 5, the condition determination sub-block 111 determines that the first necessary condition C1 is satisfied. In contrast, when the traveling speed Vc is at or above the upper limit value Vu, the condition determination sub-block 111 determines that the first necessary condition C1 is not satisfied.

A second necessary condition C2 shown in FIG. 4 is a condition related to the control deviation δc of the vehicle 2 from the trajectory required at the start of the pre-stop traveling section Sb. As shown in FIG. 2, the control deviation Oc acquired by the trajectory following sub-block 103 is input to the condition determination sub-block 111. When the absolute value of the current control deviation δc is less than an upper limit value δu shown in FIG. 5, the condition determination sub-block 111 determines that the second necessary condition C2 is satisfied. In contrast, when the absolute value of the control deviation δc is at or above the upper limit value δu, the condition determination sub-block 111 determines that the second necessary condition C2 is not satisfied.

A third necessary condition C3 shown in FIG. 4 is a condition related to a distance between the current position and the stop position Ps required at the start of the pre-stop traveling section Sb. As shown in FIG. 2, the distance Lc acquired by the target trajectory acquiring sub-block 102 is input to the condition determination sub-block 111. When the distance Lc to the stop position Ps is less than an upper limit value Lu shown in FIG. 5, the condition determination sub-block 111 determines that the third necessary condition C3 is satisfied. In contrast, when the distance Lc is at or above the upper limit value Lu, the condition determination sub-block 111 determines that the third necessary condition C3 is not satisfied.

A fourth necessary condition C4 shown in FIG. 4 is a condition related to the distance Lc required at the start of the pre-stop traveling section Sb. When the distance Lc between the current position and the stop position Ps exceeds a lower limit value Ll shown in FIG. 5, the condition determination sub-block 111 determines that the fourth necessary condition C4 is satisfied. In contrast, when the distance Lc is at or below the lower limit value Ll, the condition determination sub-block 111 determines that the fourth necessary condition C4 is not satisfied.

The first to third conditions are necessarily satisfied before the vehicle 2 stops. In contrast, the fourth necessary condition C4 may not be satisfied until the vehicle 2 stops, depending on the timing when the removal control instruction δc is generated. Accordingly, the condition determination sub-block 111 is configured to execute a removal continuing instruction Occ to continue the removal control instruction δc for cancelling the pre-stop removal control and starting a post-stop removal control.

Figure 5:
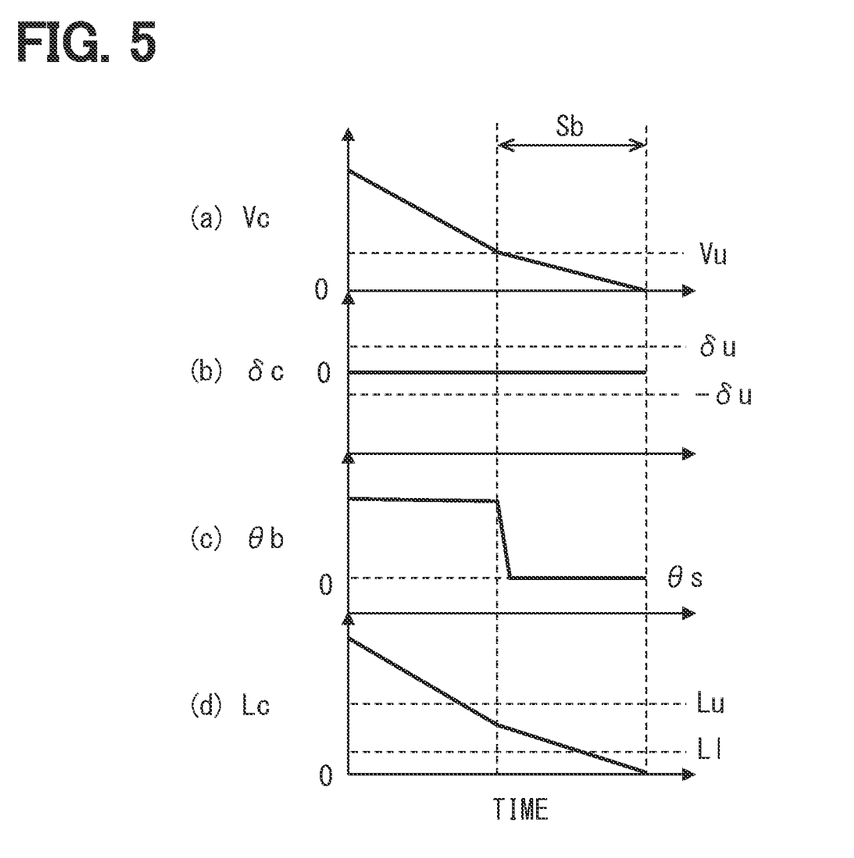
FIG. 5 is a graph for explaining a pre-stop removal control of the embodiment.

A steering maintenance sub-block 112 shown in FIG. 2 maintains a pre-stop target angle θb for the steering angle θ to be the stop control angle θs as shown in FIG. 5 in the pre-stop traveling section Sb in which the vehicle 2 travels until the vehicle 2 reaches the stop position Ps after all of the necessary conditions C1-C4 of the maintenance condition C are satisfied. The steering maintenance sub-block 112 maintains the pre-stop target angle θb to be the stop control angle θs from the start of the pre-stop traveling section Sb to the arrival at the stop position Ps. The stop control angle θs may be fixed at 0 degrees along the front-rear direction D of the vehicle 2. When the stop control angle θs is fixed to 0 degrees, the trajectory of the vehicle 2 in the pre-stop traveling section Sb is straight (see FIG. 3). The stop control angle θs may be variably set based on the steering instruction from the driving control device 5, for example. When the stop control angle θs is variably set to a value other than 0 degrees, the trajectory of the vehicle 2 in the pre-stop traveling section Sb is curved.

The steering maintenance sub-block 112 stop maintaining the pre-stop target angle θb at the stop position Ps of the pre-stop traveling section Sb. When the absolute value of an output value Ao that is output from the steering actuator 3 is within an acceptable range ΔA (see FIG. 6), the steering maintenance sub-block 112 cancels the maintenance of the pre-stop target angle θb. The output value Ao is output when the pre-stop target angle θb is maintained at the stop position Ps of the vehicle 2. In contrast, when the absolute value of the output value Ao in response to the maintenance of the steering angle θ at the stop position Ps is out of the acceptable range ΔA, the steering maintenance sub-block 112 generates the removal continuing instruction Occ to switch the pre-stop removal control to the post-stop removal control. In either case, the output value Ao is acquired by the steering output sensor 43 of the sensor system 4 and input to the steering maintenance sub-block 112. The acceptable range ΔA which is a criterion for determining the cancelation of the maintenance is smaller than an upper limit value Au (see FIG. 6) of the absolute value of the output value Ao. As a prerequisite for the cancelation of the maintenance, it is determined whether the vehicle 2 stops at the stop position Ps based on the traveling speed acquired by the traveling speed sensor 44 of the sensor system 4.

The post-stop removal control block 120 shown in FIG. 2 is configured to execute a post-stop removal control for removing the twist, which is predicted to occur in the steering tire 20, after the vehicle 2 stops traveling. Accordingly, the post-stop removal control block 120 includes sub-blocks 121, 122 having different functions.

Figure 6:
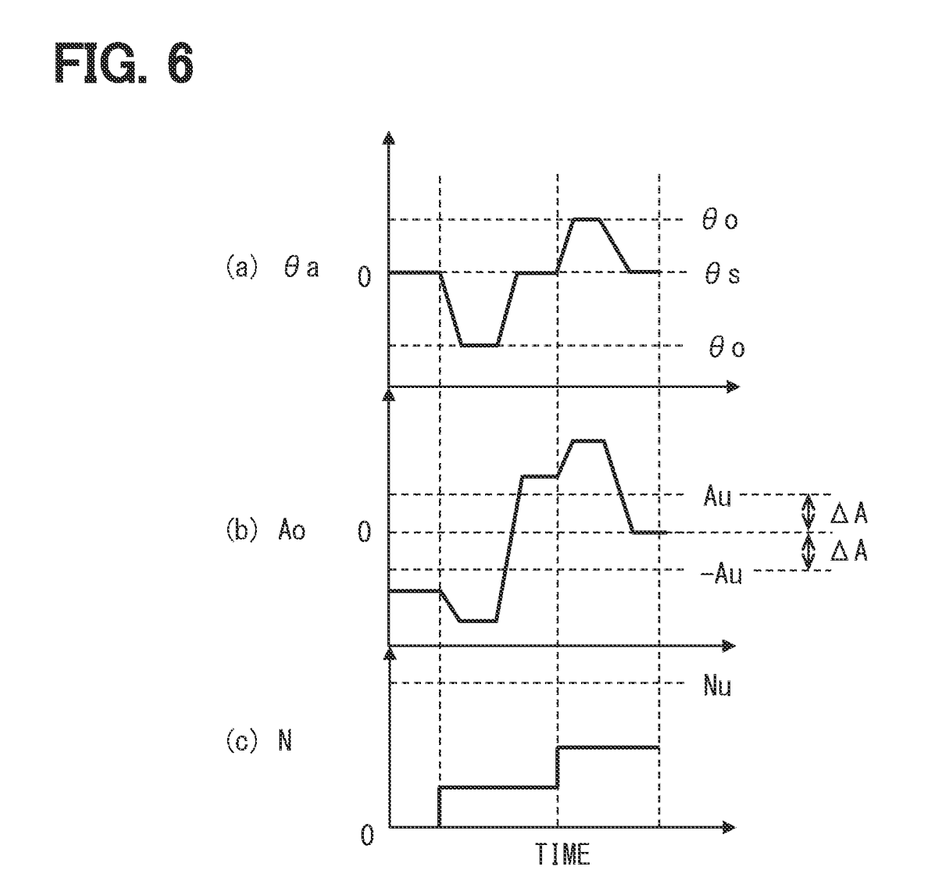
FIG. 6 is a graph for explaining a post-stop removal control of the embodiment.

An overshoot setting sub-block 121 is configured to receive the removal continuing instruction Occ from the steering maintenance sub-block 112 or a steering oscillation sub-block 122 described later. The overshoot setting sub-block 121 receives an input of the stop position Ps from the target trajectory acquiring sub-block 102. Each time the overshoot setting sub-block 121 receives these inputs, the overshoot setting sub-block 121 sets, as the steering angle θ for the steering tire 20, an overshoot angle θo that overshot from the stop control angle θs at the stop position Ps as shown in FIG. 6. The overshoot setting sub-block 121 updates the overshoot angle θo according to the output value Ao when the removal continuing instruction Occ is input. The removal continuing instruction Occ is input when the output value Ao of steering actuator 3 output in response to the maintenance of a post-stop target angle θa at the stop position Ps where the vehicle 2 stops is outside the acceptable range ΔA. The overshoot angle θo is defined by multiplying a conversion coefficient, which is a coefficient for converting the output value Ao into the steering angle θ, with the output value Ao. The conversion coefficient is alternately switched between positive and negative for each input of the removal continuing instruction Occ.

The steering oscillation sub-block 122 shown in FIG. 2 applies, each time the overshoot angle θo is set by the overshoot setting sub-block 121, the oscillation for bringing the steering angle back to the stop control angle θs after the steering angle overshot to the overshoot angle θo. The steering oscillation sub-block 122 maintains the post-stop target angle θa which is brought back to the stop control angle θs by the oscillation at the stop position Ps where the vehicle 2 stops. As a result, the steering oscillation sub-block 122 generates the removal continuing instruction Occ when the absolute value of the output value Ao output from the steering actuator 3 in response to the maintenance of the post-stop target angle θa at the stop position Ps increases outside the acceptable range ΔA. In contrast, when the absolute value of the output value Ao output in response to the maintenance of the post-stop target angle θa at the stop position Ps decreases to be within the acceptable range ΔA, the maintenance is stopped, and a removal control completion flag Fe. In either case, the output value Ao is acquired by the steering output sensor 43 of the sensor system 4 and input to the steering oscillation sub-block 122.

Due to the cooperation of the sub-blocks 121, 122, the generation of the removal continuing instruction Occ, the update of the overshoot angle θo, and the oscillation of the post-stop target angle θa are repeated at the stop position Ps until the output value Ao output from the steering actuator 3 in response to the maintenance of the post-stop target angle θa decreases into the acceptable range ΔA. As a result, the overshoot angle θo is repeatedly updated to be smaller by the setting in accordance with the output value Ao. However, when the output value Ao in response to the maintenance of the post-stop target angle θa is outside the acceptable range ΔA even after the number N of the oscillations reached an upper limit number Nu (see FIG. 6), the steering oscillation sub-block 122 forcibly stops maintaining the post-stop target angle θa. At this time as well, the steering oscillation sub-block 122 generates the removal control completion flag Fe.

The steering angle control block 130 shown in FIG. 2 is configured to control the steering angle θ of the vehicle 2. Accordingly, the steering angle control block 130 includes sub-blocks 131, 132 which have different functions.

An arbitration sub-block 131 is configured to select a fixed target angle θf from the following target angle θc set by the trajectory following sub-block 103, the pre-stop target angle θb set by the steering maintenance sub-block 112, and the post-stop target angle θa set by the steering oscillation sub-block 122. The arbitration sub-block 131 sets the pre-stop target angle θb as the fixed target angle θf when the arbitration sub-block 131 receives the input of the pre-stop target angle θb from the steering maintenance sub-block 112. In contrast, the arbitration sub-block 131 sets the post-stop target angle θa as the fixed target angle θf when the arbitration sub-block 131 receives the input of the post-stop target angle θa from the steering oscillation sub-block 122. Further, the arbitration sub-block 131 sets the following target angle θc input from the trajectory following sub-block 103 as the fixed target angle θf when the arbitration sub-block 131 does not receive the inputs of pre-stop target angle θb and the post-stop target angle θa.

Figure 7:
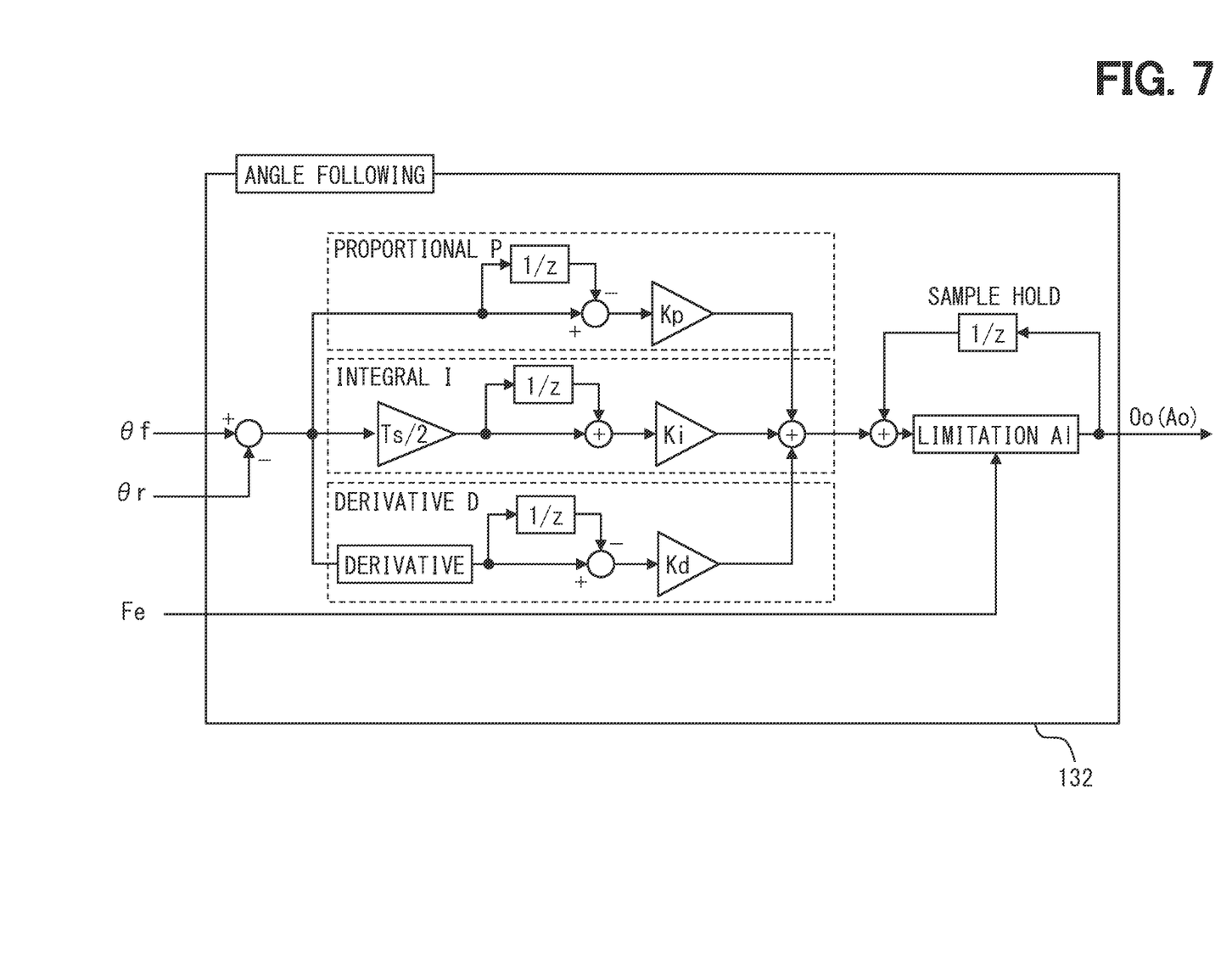
FIG. 7 is a block diagram for explaining an angle following sub-block of the steering control device according to the embodiment.

The angle following sub-block 132 executes PID control shown in FIG. 7 as the angle following control to cause the actual steering angle θr based on the internal information acquired by the steering angle sensor 42 of the sensor system 4 to follow the fixed target angle θf selected by the arbitration sub-block 131. By such angle following control, the angle following sub-block 132 generates steering output instruction Oo that instructs the output value Ao for the steering actuator 3 so that the actual steering angle θr approaches the fixed target angle θf.

The angle following sub-block 132 gives an output limitation Al of the steering actuator 3 to the steering output instruction Oo of the PID control. At this time, when the removal control completion flag Fe is input from the steering oscillation sub-block 122, the angle following sub-block 132 gradually reduces the output limitation Al of the steering actuator 3 from the rated value to the zero value. In contrast, when the removal control completion flag Fe is not input, the angle following sub-block 132 gradually increases the output limitation Al of the steering actuator 3 from the zero value to the rated value. Here, the rated value of the output limitation Al is defined as, for example, a fixed value in accordance with the rated output of the steering motor 30.

The steering actuator 3 adjusts the output value Ao shown in FIGS. 1, 2 in accordance with the steering output instruction Oo generated by the angle following sub-block 132. As a result, the steering angle θ of the steering tire is controlled to be the fixed target angle θf which is one of the target angles 8b, 8a, 8c. When the fixed target angle θf is the pre-stop target angle θb, the steering angle θ is maintained to be substantially the stop control angle θs. When the fixed target angle θf is the post-stop target angle θa, the steering angle θ is maintained to be substantially the stop control angle θs after oscillating between the stop control angle θs and the overshoot angle θo.

The flow of the steering control method for the steering control device 1 to control the steering of the vehicle 2 jointly by the trajectory control block 100, the pre-stop removal control block 110, the post-stop removal control block 120, and the steering angle control block 130 is described below with reference to FIGS. 8, 9. This flow starts in response to the input of the removal control instruction δc from the driving control device 5 to the blocks 100, 110. Further, in this flow, "S" means steps of the process executed by instructions included in the steering control program.

Figure 8:
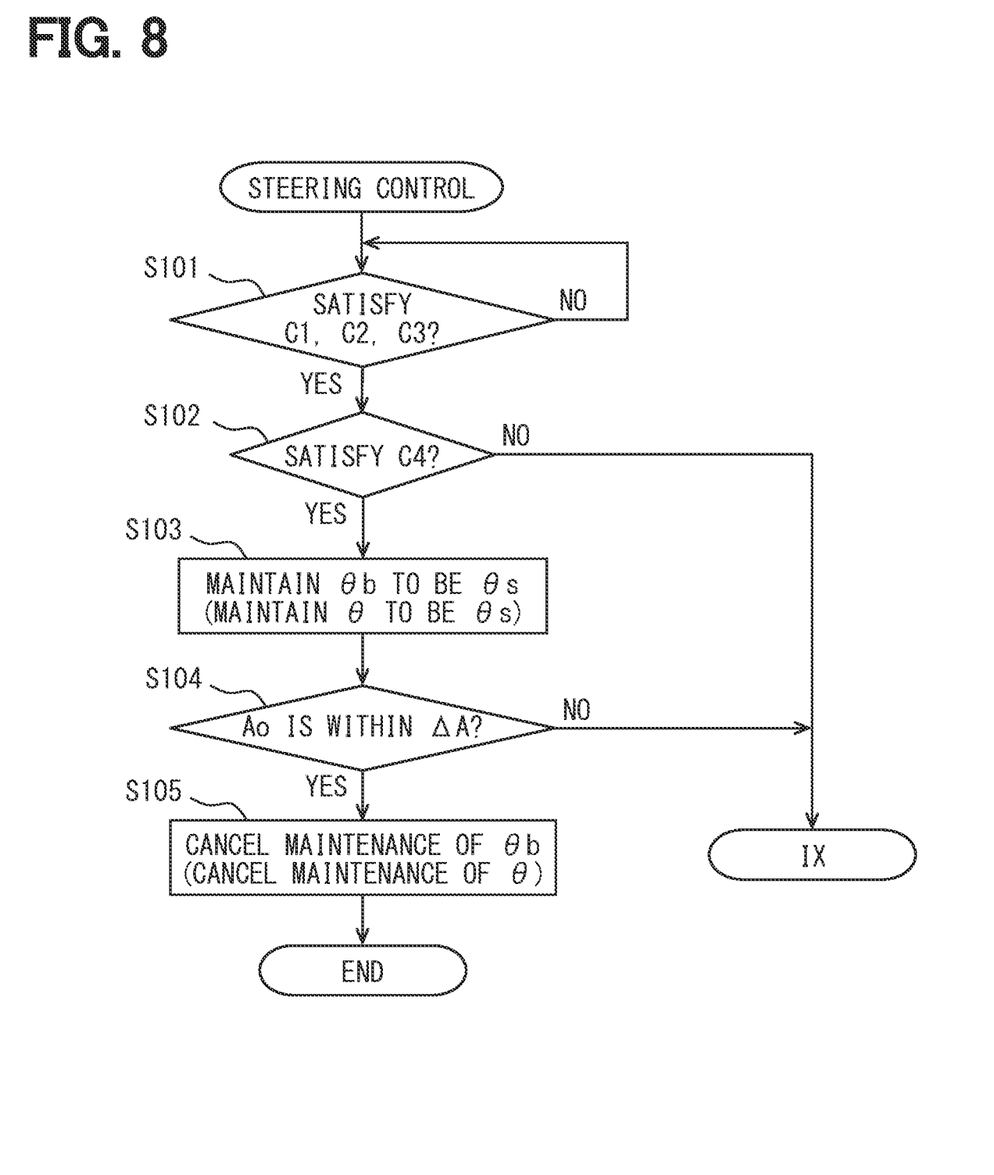
FIG. 8 is a flowchart showing a flow of a steering control method according to the embodiment.

As shown in FIG. 8, in S101, the condition determination sub-block 111 waits for the first necessary condition C1, the second necessary condition C2, and the third necessary condition C3 of the maintenance condition C to be satisfied. At this time, the condition determination sub-block 111 determines whether the current traveling speed Vc is less than the upper limit value Vu, which means the first necessary condition C1 is satisfied. The condition determination sub-block 111 determines whether the current control deviation δc is less than the upper limit value δu, which means the second necessary condition C1 is satisfied. The condition determination sub-block 111 determines whether the distance Lc from the current position to the stop position Ps is less than the upper limit value Lu, which means the third necessary condition is satisfied. When it is confirmed by the condition determination sub-block 111 that the necessary conditions C1, C2, C3 are satisfied, the flow proceeds to S102.

In S102, the condition determination sub-block 111 determines whether the fourth necessary condition C4 of the maintenance condition C is satisfied. At this time, the condition determination sub-block 111 determines whether the distance Lc from the current position to the stop position Ps exceeds the lower limit value Ll, which means the fourth necessary condition is satisfied. When it is determined that the fourth necessary condition C4 is satisfied, the flow proceeds to S103.

In S103, the steering maintenance sub-block 112 maintains the pre-stop target angle θb for the steering angle θ to be the stop control angle θs in the pre-stop traveling section Sb in which the vehicle 2 travels until the vehicle 2 reaches the stop position Ps after all of the necessary conditions C1-C4 are satisfied. As a result, the steering angle θ is maintained to the stop control angle θs by the functions of the sub-blocks 131, 132. When the steering maintenance sub-block 112 confirms in S103 that the vehicle 2 stops at the stop position Ps, the flow proceeds to S104.

In S104, the steering maintenance sub-block 112 determined whether the absolute value of the output value Ao output from the steering actuator 3 in response to the maintenance of the steering angle θ following the pre-stop target angle θb at the stop position Ps is within the acceptable range ΔA. When it is determined that the absolute value is within the acceptable range ΔA, the flow proceeds to S105. Accordingly, the current execution of the flow ends after the maintenance of the steering angle θ due to the functions of the sub-blocks 131, 132 is cancelled in accordance with the cancellation of the maintenance of the pre-stop target angle θb by the steering maintenance sub-block 112.

Figure 9:
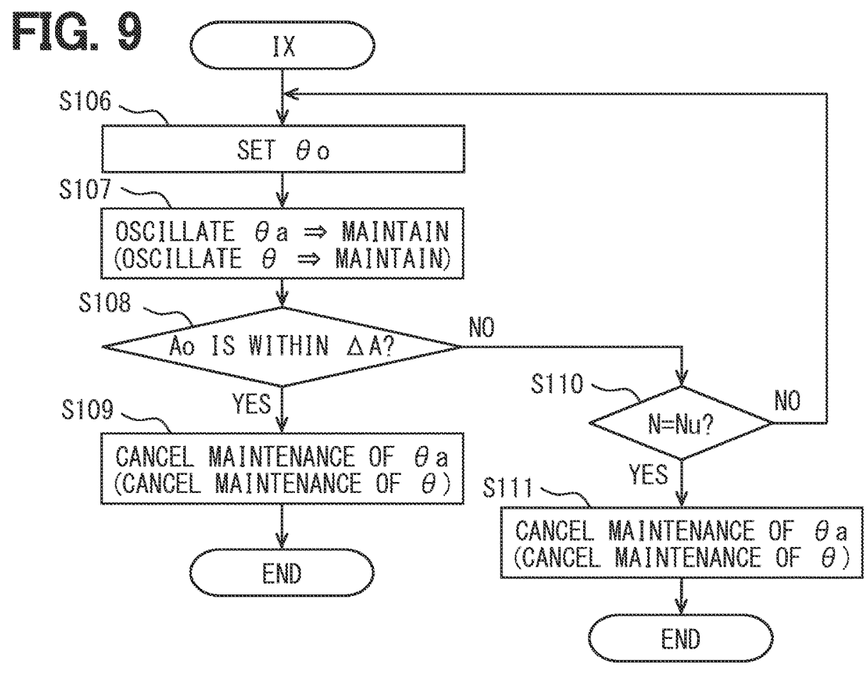
FIG. 9 is a flowchart showing the flow of the steering control method according to the embodiment.

When a negative determination is made in S104 or S102 shown in FIG. 8, the flow proceeds to S106 as shown in FIG. 9. In S106, the overshoot setting sub-block 121 sets the overshoot angle θo which overshoots from the stop control angle es maintained for the stop position Ps. In S107, the steering oscillation sub-block 122 gives the post-stop target angle θa of the steering angle θ the oscillation such that the steering angle θ returns to the stop control angle θs after overshooting to the overshoot angle θo set in S106. As a result, the oscillation between the stop control angle θs and the overshoot angle θo is given to the steering angle θ by the functions of the sub-blocks 131, 132. After the steering oscillation sub-block 122 maintains the post-stop target angle θa which returned to the stop control angle θs in S107 and the steering angle θ is maintained by the functions of the sub-blocks 131, 132, the flow proceeds to S108.

In S108, the steering oscillation sub-block 122 determined whether the absolute value of the output value Ao output from the steering actuator 3 in response to the maintenance of the steering angle θ following the post-stop target angle θa at the stop position Ps decreased within the acceptable range ΔA. When it is determined that the absolute value is within the acceptable range ΔA, the flow proceeds to S109. Accordingly, the current execution of the flow ends after the maintenance of the steering angle θ due to the functions of the sub-blocks 131, 132 is cancelled in accordance with the cancellation of the maintenance of the post-stop target angle θa by the steering maintenance sub-block 112.

When it is determined that the absolute value of the output value Ao is not within the acceptable range ΔA, the flow proceeds to S110. In S110, the steering oscillation sub-block 122 determines whether the number N of oscillations in the current execution of this flow has reached the upper limit number Nu. When it is determined that the number N has not reached, the flow returns to S106. When it is determined that the number N has reached the upper limit number Nu, the flow proceeds to S111. Accordingly, the current execution of the flow ends after the maintenance of the steering angle θ due to the functions of the sub-blocks 131, 132 is cancelled in accordance with the cancellation of the maintenance of the post-stop target angle θa by the steering maintenance sub-block 112.

In the present embodiment, the condition determination sub-block 111 corresponds to a condition determination unit, and the steering maintenance sub-block 112 corresponds to a steering maintenance unit. In the present embodiment, the overshoot setting sub-block 121 corresponds to an overshoot setting unit, and the steering oscillation sub-block 122 corresponds to a steering oscillation unit.

In the present embodiment, S101, S102 correspond to a condition determination process, and S103, S104, S105 correspond to a steering maintenance process. In the present embodiment, S106 corresponds to an overshoot setting process, and S107, S108, S109, S110, S111 corresponds to a steering oscillation process.

(Operation Effects)

The functions and effects in the present embodiment described above will be explained below.

According to the embodiment, the steering angle θ is maintained to be the stop control angle θs in the pre-stop traveling section Sb in which the vehicle 2 travels to the stop position Ps after the maintenance condition C is satisfied. According to this, even when the steering tire 20 is twisted due to the adjustment of the steering angle θ before the pre-stop traveling section Sb, the steering tire 20 can be elastically restored in the pre-stop traveling section Sb while the steering angle θ is maintained at the stop control angle θs. Accordingly, the twist of the steering tire 20 can be eliminated before the vehicle 2 stop travelling at the stop position Ps which is the end of the pre-stop traveling section Sb, and the shift of the steering angle θ caused by the twist can be suppressed.

According to the embodiment, the maintenance condition C includes a condition related to the traveling speed Vc of the vehicle 2 which is required to maintain the steering angle θ at the start of the pre-stop traveling section Sb. According to this, it is possible to avoid a situation in which the stop position Ps changes because the steering angle θ is maintained at the stop control angle θs when the traveling speed Vc is too high. It is also possible to avoid a situation where the behavior of the vehicle 2 changes because the pre-stop traveling section Sb starts in a situation where the traveling speed Vc is too high and the steering angle θ is adjusted to be the stop control angle θs. Accordingly, the shift of the steering angle θ at the predefined stop position Ps due to the twist of the steering tire 20 before stop traveling can be suppressed, and it is possible to suppress the deterioration of ride quality due to sudden changes in the behavior of vehicle 2 caused by the elimination of the twist.

According to the embodiment, the maintenance condition C includes a condition related to the control deviation δc from the target trajectory Tz of the vehicle 2 which is required to maintain the steering angle θ at the start of the pre-stop traveling section Sb. According to this, it is possible to avoid a situation in which the stop position Ps changes because the steering angle θ is maintained at the stop control angle θs when the control deviation δc is too large. Accordingly, the shift of the steering angle θ at the predefined stop position Ps due to the twist of the steering tire 20 before the vehicle 2 stop traveling can be suppressed.

According to the embodiment, the maintenance condition C includes a condition related to the distance Lc to the stop position Ps which is required to maintain the steering angle θ at the start of the pre-stop traveling section Sb. According to this, it is possible to avoid a situation in which the stop position Ps changes because the steering angle θ is maintained at the stop control angle θs when the distance Lc to the stop position Ps is excessive or insufficient. Accordingly, the shift of the steering angle θ at the predefined stop position Ps due to the twist of the steering tire 20 before the vehicle 2 stop traveling can be suppressed.

According to the embodiment, the steering angle θ is maintained at the stop control angle θs from the start of the pre-stop traveling section Sb to the arrival at the stop position Ps. According to this, even when the steering tire 20 is twisted due to the adjustment of the steering angle θ before the pre-stop traveling section Sb, the twist can be removed by restoring the steering tire 20 using the entire area of the pre-stop traveling section Sb. Accordingly, the reliability can be secured by the effect of suppressing the shift of the steering angle θ due to the twist of the steering tire 20.

According to the present embodiment, the maintenance of the steering angle θ is cancelled at the stop position Ps of the vehicle 2. According to this, the maintenance of the steering angle θ ends after the steering tire 20 is restored by maintaining the steering angle θ at the stop control angle θs in the pre-stop traveling section Sb. Accordingly, it is not necessary to keep actuating the steering actuator 3 of the vehicle 2 to suppress the shift by maintaining the steering angle θ, and the electric power for actuating the steering actuator 3 can be reduced.

According to the embodiment, when the output value Ao of the steering actuator 3 output in response to maintaining the steering angle θ at the stop position Ps is within the acceptable range ΔA, the maintenance of the steering angle θ is canceled. According to this, the removal of the twist of the steering tire 20 by the traveling of the vehicle 2 in the pre-stop traveling section Sb is confirmed with the decrease of the output value Ao within the acceptable range ΔA, and then the maintenance of the steering angle θ at the stop control angle θs ends. Accordingly, the power consumption by the steering actuator 3 can be reduced, and the reliability can be secured by the effect of suppressing the shift of the steering angle θ due to the twist of the steering tire 20.

According to the embodiment, when the output value Ao of the steering actuator 3 output in response to the maintenance of the steering angle θ at the stop position Ps of the vehicle 2 increases outside the acceptable range ΔA, the oscillation is given to the steering angle θ to overshoot the steering angle θ to the overshoot angle θo and then bring it back to the stop control angle θs. According to this, even when the output value Ao is outside the acceptable range ΔA due to the twist caused by the adjustment of the steering angle θ before the vehicle 2 stops traveling, the steering angle θ can be returned to the stop control angle θs by oscillating the steering angle θ to restore the steering tire 20. In the embodiment, even when the output value Ao is outside the acceptable range ΔA because the twist is not completely eliminated in the pre-stop traveling section Sb, the steering angle θ can be returned to the stop control angle θs by oscillating the steering angle θ to restore the steering tire 20. Accordingly, the shift of the steering angle due to the twist can be suppressed by removing the twist of the steering tire 20 of the vehicle 2 which stopped traveling.

According to the embodiment, when the output value Ao of the steering actuator 3 output in response to maintaining the steering angle θ at the stop position Ps increases outside the acceptable range ΔA, the overshoot angle θo is set in accordance with the output value Ao. According to this, the oscillation between the stop control angle θs and the overshoot angle θo according to the output value Ao that becomes larger as the steering tire 20 is twisted is limited within an angle range necessary to eliminate the twist. Accordingly, the twist of the steering tire 20 caused by the oscillation can be suppressed, and the twist due to the adjustment of the steering angle θ before the vehicle 2 stops traveling. Accordingly, the effect of suppressing the shift of the steering angle θ due to the twist of the steering tire 20 can be secured.

According to the embodiment, the oscillation of the steering angle θ is repeated until the output value Ao of the steering actuator 3 output in response to maintaining the steering angle θ at the stop position Ps decreases to be within the acceptable range ΔA. According to this, even when the steering tire 20 is twisted by the adjustment of the steering angle θ before the vehicle 2 stop traveling, the steering tire 20 can be elastically restored by the repeated oscillation. Accordingly, the reliability can be secured by the effect of suppressing the shift of the steering angle θ due to the twist of the steering tire 20.

According to the embodiment, when the output value Ao of the steering actuator 3 output in response to the maintenance of the steering angle θ at the stop position Ps of the vehicle 2 increases outside the acceptable range ΔA after the number N of the oscillation of the steering angle θ reached the upper limit number Nu, the oscillation of the steering angle θ is stopped. According to this, even when the output value Ao is outside the acceptable range ΔA even after the repeated oscillation, an infinite loop of the confirmation of the output value Ao and the oscillation control can be avoided. Therefore, it is possible to exert the effect of suppressing the shift of the steering angle θ due to the twist of the steering tire 20 while avoiding the control failure of the steering angle θ.

Other Embodiments

Although one embodiment has been described, the present disclosure should not be limited to the above embodiment and may be applied to various other embodiments within the scope of the present disclosure.

The steering control device 1 of the modification may be a special purpose computer configured to include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

In S101 performed by a condition determination sub-block 111 of a modification example, the first necessary condition C1 may be satisfied when the traveling speed Vc is at or below the upper limit value Vu. In S10 performed by a condition determination sub-block 111 of a modification example, the second necessary condition C2 may be satisfied when the control deviation δc is at or below the upper limit value δ. In S101 performed by a condition determination sub-block 111 of a modification example, the third necessary condition C3 may be satisfied when the traveling distance Lc is at or below the upper limit value Lu. In S102 performed by a condition determination sub-block 111 of a modification example, the fourth necessary condition C4 may be satisfied when the traveling distance Lc is at or above the lower limit value Ll. In S104, S108 performed by sub-blocks 112, 121 of a modification example, the acceptable range ΔA may be set in a range at or below the upper limit value Au.

In S101 performed by the condition determination sub-block 111 of a modification example, at least one determination of the necessary conditions C1, C2, C3 may be skipped. In a modification example, S102 performed by the condition determination sub-block 111 may be skipped. In a modification example, a maintenance condition C other than the necessary conditions C1-C4 may be determined in at least one of S101 or S102. In a modification example, the maintenance processing of the pre-stop target angle θb and the steering angle θ by the steering maintenance sub-block 112 in S103 may be performed only in a part of the pre-stop traveling section Sb from a time when the maintenance condition C is satisfied to a time when the vehicle 2 arrives at the stop position Ps. In such a limited maintenance processing, the maintenance processing may be performed continuously or intermittently to eliminate the twist of the steering tire 20 and at the stop position Ps.

Figure 10:
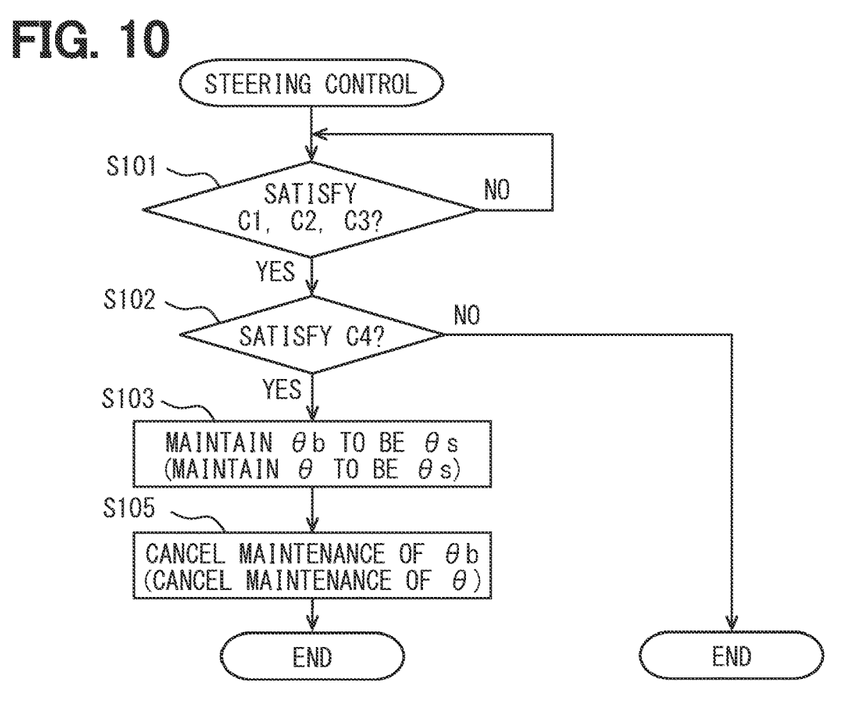
FIG. 10 is a flowchart showing a flow of a steering control method according to a modification example.

In a modification example, S105 performed by the steering maintenance sub-block 112 may be skipped and the flow may be terminated in a condition where the maintenance process of the pre-stop target angle θb and the steering angle θ performed at the stop position Ps by the steering maintenance sub-block 112 in S103 is not stopped. As shown in FIG. 10, in a modification example, the post-stop removal control may be omitted by skipping S104, S106-S111 performed by the sub-blocks 112, 121, 122. In this case, the maintenance of the pre-stop target angle θb and the steering angle θ performed by the steering maintenance sub-block 112 in S103 may be forcibly stopped at the stop position Ps by the steering maintenance sub-block 112 in S105. In addition, the flow may be terminated without performing the pre-stop removal control and the post-stop removal control when a negative determination is made by the condition determination sub-block 111 in S102.

In a modification example, the overshoot angle θo may be fixed by the overshoot setting sub-block 121. In a modification example, S108, S110, S111 performed by the steering oscillation sub-block 122 may be skipped, and the maintenance of the post-stop target angle θa and the steering angle θ performed by the steering oscillation sub-block 122 in S107 may be forcibly stopped at the stop position Ps by the steering oscillation sub-block 122 in S109. In a modification example, S110 performed by the steering oscillation sub-block 122 may be skipped and the flow may be returned from S108 to S106.

Figure 11:
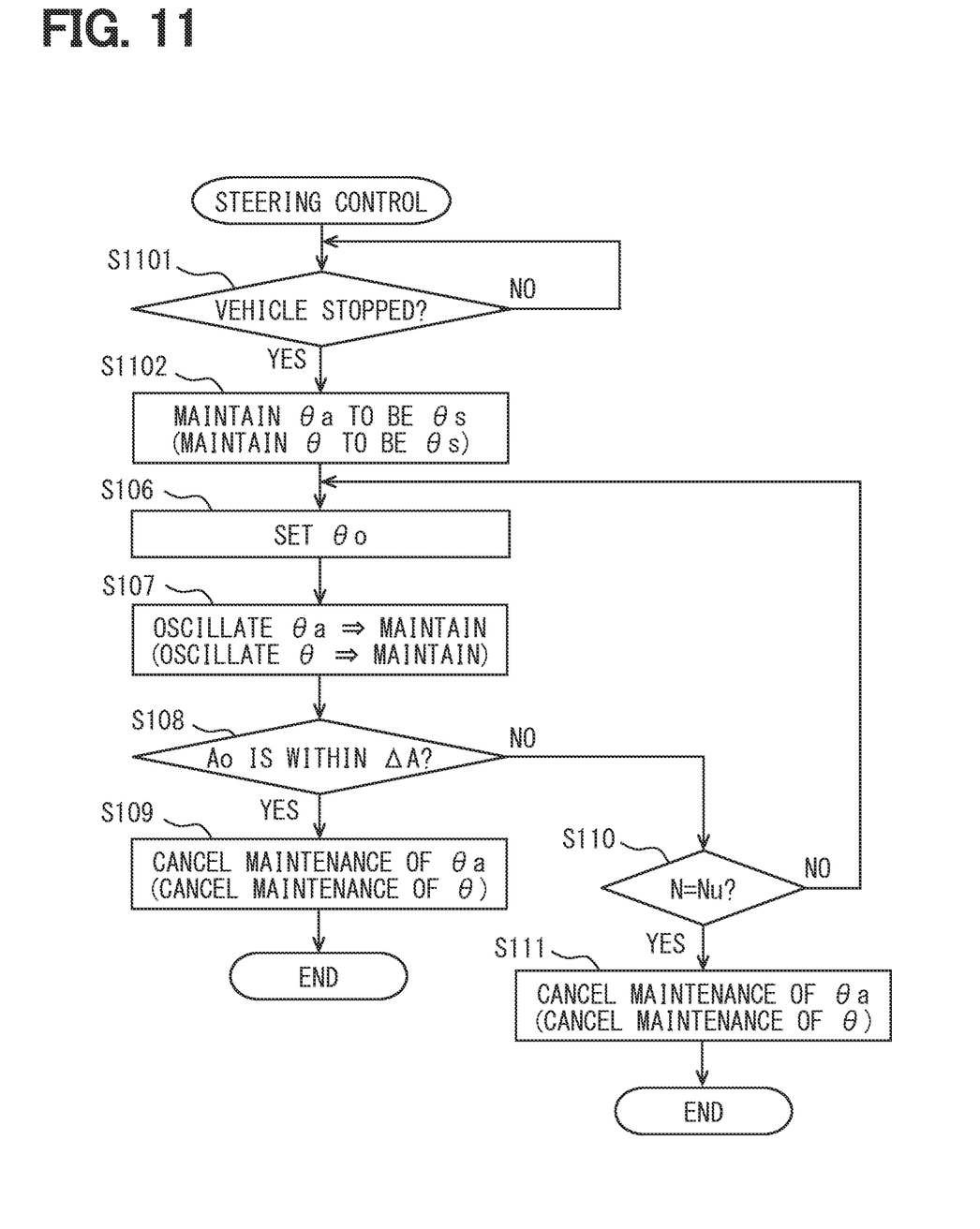
FIG. 11 is a flowchart showing a flow of a steering control method according to another modification example.

As shown in FIG. 11, in a modification example, the pre-stop removal control may be omitted by skipping S101-S105 performed by the sub-blocks 111, 112. In this case, after the stop of the vehicle 2 is confirmed by the condition determination sub-block 111 in S1101 and before S106, the maintenance process of the post-stop target angle θa and the steering angle θ by the condition determination sub-block 111 in S1102 may be performed.

What is claimed is:

1. A steering control device configured to control steering via a steering actuator of a vehicle, the steering control device comprising:
   a processor;
   a non-transitory computer-readable storage medium; and
   a set of computer-executable instructions stored on the non-transitory computer-readable storage medium that cause the processor to:
   determine whether a maintenance condition required to keep a steering angle at a stop control angle is satisfied, the steering angle being given by the steering actuator to a tire of the vehicle, the stop control angle being the steering angle which is to be given at a stop position where the vehicle stops traveling; and
   keep the steering angle at the stop control angle in a pre-stop traveling section in which the vehicle travels until the vehicle arrives at the stop position after the maintenance condition is satisfied, wherein
   the maintenance condition includes a condition related to a traveling speed of the vehicle and required to start the pre-stop traveling section, and
   when the processor determines, as satisfaction of the maintenance condition, that the traveling speed of the vehicle at a start position of the pre-stop traveling section is less than a predetermined threshold, the processor keeps the steering angle at the stop control angle in the pre-stop traveling section.

2. The steering control device according to claim 1, wherein
   the maintenance condition includes a condition related to a control deviation from a traveling trajectory of the vehicle and required to start the pre-stop traveling section.

3. The steering control device according to claim 2, wherein
   when the processor determines, as satisfaction of the maintenance condition, that the control deviation from the traveling trajectory of the vehicle at a start position of the pre-stop traveling section is less than a predetermined threshold, the steering angle is kept at the stop control angle in the pre-stop traveling section.

4. The steering control device according to claim 1, wherein
   the maintenance condition includes a condition related to a traveling distance of the vehicle to the stop position and required to start the pre-stop traveling section.

5. The steering control device according to claim 4, wherein
   when the processor determines, as satisfaction of the maintenance condition, that the traveling distance of the vehicle from a start position of the pre-stop traveling section to the stop position of the pre-stop traveling section is less than a predetermined distance, the steering angle is kept at the steering angle at the stop control angle in the pre-stop traveling section.

6. The steering control device according to claim 1, wherein
   the set of computer-executable instructions stored on the non-transitory computer-readable storage medium further cause the processor to keep the steering angle at the stop control angle from a time when the pre-stop traveling section is started to a time when the vehicle arrives at the stop position.

7. The steering control device according to claim 1, wherein
   the set of computer-executable instructions stored on the non-transitory computer-readable storage medium further cause the processor to stop keeping the steering angle at the steering position.

8. The steering control device according to claim 7, wherein
   the set of computer-executable instructions stored on the non-transitory computer-readable storage medium further cause the processor to stop keeping the steering angle when an output value output from the steering actuator in response to keeping the steering angle at the stop position is within an acceptable range.

9. The steering control device according to claim 8, wherein
   the set of computer-executable instructions stored on the non-transitory computer-readable storage medium further cause the processor to:
   set, as the steering angle, an overshoot angle overshooting from the stop control angle; and
   give an oscillation to the steering angle such that the steering angle overshoots to the overshoot angle and then the steering angle returns to the steering control angle when the output value output from the steering actuator in response to keeping the steering angle at the stop position is outside the acceptable range.

10. The steering control device according to claim 9, wherein
    the set of computer-executable instructions stored on the non-transitory computer-readable storage medium further cause the processor to set the overshoot angle in accordance with the output value when the output value output from the steering actuator in response to keeping the steering angle at the stop position is outside the acceptable range.

11. The steering control device according to claim 9, wherein
    the set of computer-executable instructions stored on the non-transitory computer-readable storage medium further cause the processor to repeat the oscillation of the steering angle until the output value output from the steering actuator in response to keeping the steering angle at the stop position decreases within the acceptable range.

12. The steering control device according to claim 11, wherein
    the set of computer-executable instructions stored on the non-transitory computer-readable storage medium further cause the processor to stop the oscillation of the steering angle when the output value output from the steering actuator in response to keeping the steering angle at the stop position is outside the acceptable range after a repeated number of the oscillation reaches an upper limit number.

13. A method for a processor to control steering via a steering actuator of a vehicle, the method comprising:
    determining whether a maintenance condition required to keep a steering angle at a stop control angle is satisfied, the steering angle being given by the steering actuator to a tire of the vehicle, the stop control angle being the steering angle which is to be given at a stop position where the vehicle stops traveling; and
    keeping the steering angle at the stop control angle in a pre-stop traveling section in which the vehicle travels until the vehicle arrives at the stop position after the maintenance condition is satisfied, wherein the maintenance condition includes a condition related to a traveling speed of the vehicle and required to start the pre-stop traveling section, and in response to determining, as satisfaction of the maintenance condition, that the traveling speed of the vehicle at a start position of the pre-stop traveling section is less than a predetermined threshold, the steering angle is kept at the stop control angle in the pre-stop traveling section.

14. The method according to claim 13, wherein
the maintenance condition includes a condition related to a control deviation from a traveling trajectory of the vehicle and required to start the pre-stop traveling section.

15. The method according to claim 14, wherein
in response to determining, as satisfaction of the maintenance condition, that the control deviation from the traveling trajectory of the vehicle at a start position of the pre-stop traveling section is less than a predetermined threshold, the steering angle is kept at the stop control angle in the pre-stop traveling section.

16. The method according to claim 13, wherein
the maintenance condition includes a condition related to a traveling distance of the vehicle to the stop position and required to start the pre-stop traveling section.

17. The method according to claim 16, wherein
in response to determining, as satisfaction of the maintenance condition, that the traveling distance of the vehicle from a start position of the pre-stop traveling section to the stop position of the pre-stop traveling section is less than a predetermined distance, the steering angle is kept at the stop control angle in the pre-stop traveling section.

18. The method according to claim 13, wherein
in the keeping the steering angle, the steering angle is kept at the stop control angle from a time when the pre-stop traveling section is started to a time when the vehicle arrives at the stop position.

19. The method according to claim 13, wherein
in the keeping the steering angle, the keeping of the steering angle is stopped at the stop position.

20. The method according to claim 19, wherein
in the keeping the steering angle, the keeping of the steering angle is stopped when an output value output from the steering actuator in response to keeping the steering angle at the stop position is within an acceptable range.

21. The method according to claim 20, further comprising:
setting, as the steering angle, an overshoot angle overshooting from the stop control angle; and
giving an oscillation to the steering angle such that the steering angle overshoots to the overshoot angle and then the steering angle returns to the steering control angle when the output value output from the steering actuator in response to keeping the steering angle at the stop position is outside the acceptable range.

22. The method according to claim 21, wherein
in the setting the overshoot angle, the overshoot angle is set in accordance with the output value when the output value output from the steering actuator in response to keeping the steering angle at the stop position is outside the acceptable range.

23. The method according to claim 21, wherein
in the giving the oscillation, the oscillation of the steering angle is repeated until the output value output from the steering actuator in response to keeping the steering angle at the stop position decreases within the acceptable range.

24. The method according to claim 23, wherein
in the giving the oscillation, the oscillation of the steering angle is stopped when the output value output from the steering actuator in response to keeping the steering angle at the stop position is outside the acceptable range after a repeated number of the oscillation reaches an upper limit number.

25. A computer program product for controlling steering via a steering actuator of a vehicle, the computer program product being stored on at least one non-transitory computer readable medium and comprising instructions configured to, when executed by at least one processor, cause the at least one processor to:

determine whether a maintenance condition required to keep a steering angle at a stop control angle is satisfied, the steering angle being given by the steering actuator to a tire of the vehicle, the stop control angle being the steering angle which is to be given at a stop position where the vehicle stops traveling; and keep the steering angle at the stop control angle in a pre-stop traveling section in which the vehicle travels until the vehicle arrives at the stop position after the maintenance condition is satisfied, wherein the maintenance condition includes a condition related to a traveling speed of the vehicle and required to start the pre-stop traveling section, and in response to determining, as satisfaction of the maintenance condition, that the traveling speed of the vehicle at a start position of the pre-stop traveling section is less than a predetermined threshold, the steering angle is kept at the stop control angle in the pre-stop traveling section.

* * * * *